Dec. 28, 1965  F. JAMNIK  3,226,219
DEVICE FOR THE FABRICATION OF U-SHAPED PROFILES
OF GLASS IN A CONTINUOUS ROLLING PROCEDURE
Filed June 22, 1961  2 Sheets-Sheet 1
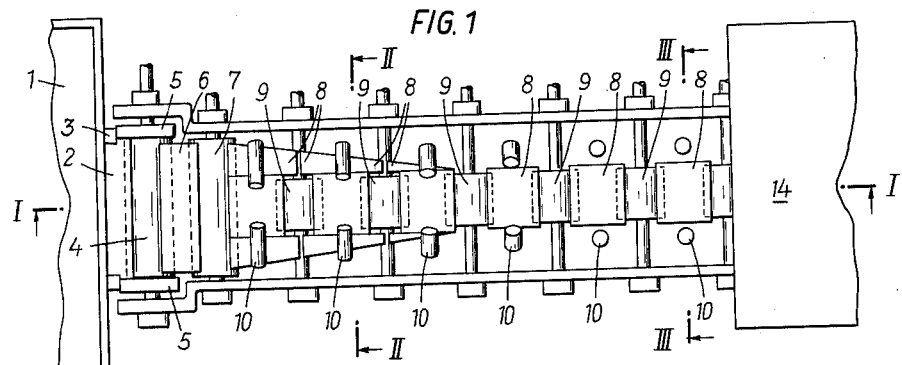
FIG. 1
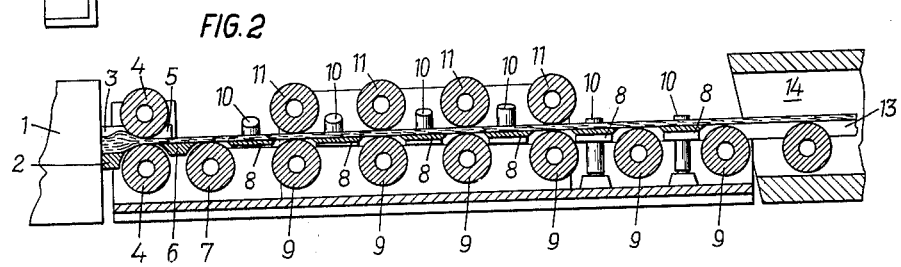
FIG. 2
FIG. 3
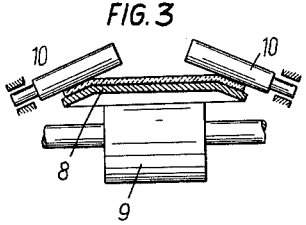
FIG. 4
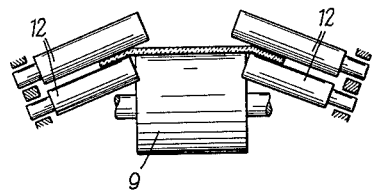
FIG. 5
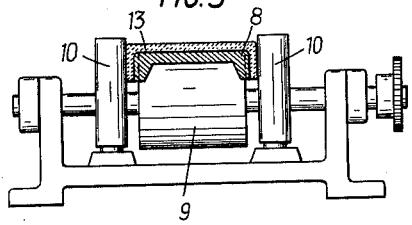
FIG. 6
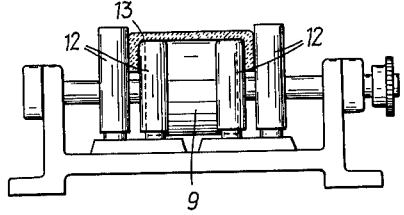
Inventor
Fridolin Jamnik
By Michael S. Striker
Attorney

United States Patent Office 3,226,219
Patented Dec. 28, 1965

3,226,219
DEVICE FOR THE FABRICATION OF U-SHAPED PROFILES OF GLASS IN A CONTINUOUS ROLLING PROCEDURE
Fridolin Jamnik, Vienna, Austria, assignor to Moosbrunner Glasfabriks-Aktiengesellschaft, Vienna, Austria
Filed June 22, 1961, Ser. No. 118,904
Claims priority, application Austria, June 14, 1961,
A 4,624/61
15 Claims. (Cl. 65—170)

The invention relates to a device, with which in a continuous rolling procedure of the extremely plastic raw glass ribbon carried from the melting tub an U-profile of predetermined measures and border formation is provided.

Known devices were thereto employed to provide glass plates on one of their longitudinal edge with an off-set angle edge, while the glass is sent through in an still plastic state between two pairs of axle parallel rollers, the respective diameter of which corresponds to the desired bending at right angles, which lies essentially in the size order of the thickness of the glass. By this, there cannot be produced completely straight side or longitudinal edges respectively, without subsequent cutting.

Also with the known device for the fabrication of undulated glass, there is not possible to obtain products of predetermined measures or determined brink formation.

Procedure and device, which did only give to the plastic glass a formgiving support, and which left the glass during its flow over the form supporting means to the influences of the force of gravity, could only provide before everything round forms, which necessitated as to their longitudinal brinks, absolutely a secondary fashioning by cutting.

The present invention solves the task set thereby, that the raw glass ribbon is submitted to grooving (calibration), by sending the raw glass ribbon through a pair of draw-in rollers whereby, their slit on both sides is sealed by closing blocks and gives to the inflowing glass stream a ribbon form of exact breadth and desired border formation. Rollers and bridges serve for the conveyance of the ribbon under elimination of deformations. Rollers and supporting plates take upon themselves this task, whereby revolution bodies, e.g., shaping rollers of horizontal to vertical position exert on the glass pressure and it so bring to lie permanently close to the supporting plates and/or supporting rollers, which in its arrangement are preparing and finally assuming U-shape, whereby U-profiles will be finally produced which are lying with their shanks downwards.

The dimensioning of the raw glass ribbon, which serves for the solution of the task set may be then attained in the expedient manner, plenty satisfactorily, when the space (slit) between the upper and lower draw-in roller at the end of the roller bodies is locked up by closing blocky, whereby the absolutely required jointlessness of the front faces of the roller bodies and the closing blocks will be best attained by permanent pressing-to of the closing blocks, e.g., by means of spring power. For the elimination of frictional resistance between the roller bodies and the closing blocks, there is provided an automatic lubrication on the surfaces which are gliding one upon another.

The dimensioned glass ribbon, owing to its still plastic condition needs a careful support by carrying rollers and at the same time transport rollers, which require a corresponding complement by bridges between these rollers.

The U-profile shaping to be performed requires the employment of revolution bodies, e.g., shaping rollers are carrying the glass ribbon to a close lying-to on the supporting plates provided for the support of the glass ribbon from below, which are provided projecting between the rollers supporting the profile stay. These supporting plates assume in the direction of production relative to its side parts a position which prepares and supports the glass ribbon from the horizontal line to the vertical line, so that the adjacent parts of the glass ribbon receive in this way, U-shape.

Instead of the co-operation of shaping rollers with supporting plates, there can find also use only revolution bodies, e.g., rolls, whereby for the avoidance of deformations of the glass ribbon and the profile respectively, there are arranged rollers in pairs which are engaging from within and from without.

With the supporting rollers under the glass ribbon, within the reach of the future U-profile stay, is only an unilateral influence set, and on that account, in the meaning of the task set, press rollers are arranged over the supporting rollers to obtain plane profile stays.

In order to have as far as possible for the clearance of eventually occurring troubles of production, a ready and unhindered admittance to the glass ribbon and the profile respectively, the shaping means engaging from without are arranged engageable and disengageable.

For the guarantee of a permanently uniform influence of the shaping means brought into action from without upon the glass ribbon, these will be brought by the employment of spring power to a lying-to on the ribbon to be shaped.

A subsequent processing of the edges of rolled glass products signifies the endangering of the products, as the cracks caused later can lead to ruptures. With profile glass tables, which e.g., according to destination, will be used as a glazing of walls and roofs, there must be paid attention especially to the faultless condition of the longitudinal edges (borders) in every direction. Experience has taught, that the strength of the glass will be co-determined essentially by its faultless and unhurt surface.

To avoid any subsequent processing of the borders, these borders will be given by the device under consideration with the dimensioning of the ribbon of raw glass its final form according to wish. The formation of the ends of the draw-in rollers in co-operation with the closing blocks, makes possible the accomplishment of the task set. Hence it is possible to give to the borders any needed form for the subsequent application of the profile glass tables.

The special conditions of temperature with the processing of glass require on the one hand to cool down the devices and plant parts heated up by contact with the liquid glass; and on the other hand to care for, that the glass, which during the course of its processing looses continuously heat, receives if required, a supply of heat.

For the elimination of troubles of production and the formation of waste material, there must be paid attention to the jointlessness of the rolling plant as against the closing means. With the passage of the ribbon of raw glass through the slit between the upper and the lower draw-in roller, the glass will fill it up to the closing blocks. In order to avoid a leaving of the glass between the roller body ends and the closing blocks, it is provided e.g., to press the closing blocks by spring power against the front faces of the upper and lower roller. But thereby arises a trouble some friction, whose elimination ought to take place by an automatic supply of lubricants.

The invention is illustrated in the drawing by way of example and is in detail described hereafter in this same drawing.

FIG. 1 shows a top view of an embodiment of the object of the invention;

FIG. 2 shows the vertical longitudinal section I—I through FIG. 1;

FIG. 3 shows the vertical section II—II through FIG. 1, with one embodiment of the shaping means;

FIG. 4 shows the vertical section II—II through FIG. 1, with another embodiment of the shaping means;

FIG. 5 shows the vertical section III—III through FIG. 1, with an embodiment of the shaping means in end position;

FIG. 6 shows the vertical section III—III through FIG. 1, with a further embodiment of the shaping means in end position;

Figure 7:
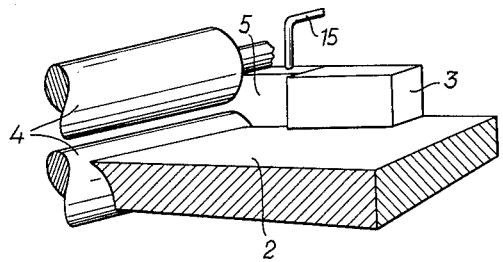
FIG. 7 shows a partly cut view of the draw-in rollers with the closing block seen from the side of the glass supply.

In FIGS. 1 and 2 of the drawing, is indicated with 1 the source of molten vitreous material in the form of a melting tub, which contains the glass in a molten condition. The glass flows over the machine piece 2, bounded by the laterally movable brink pieces 3, to the draw-in rollers 4. The slit or gap between the draw-in rollers is laterally bounded by the closing blocks 5. These closing blocks are cooled just so as the draw-in rollers themselves, for instance by water. The closing blocks 5 are besides, fitted out with a supply of lubricating stuff. Through the cooling of the closing blocks the adhesion temperature of the glass on metal will not be attained. The glass can therefore glide along the closing blocks. The production of serviceable profiles requires the absolute rectilinearity, which condition will be fulfilled by a trouble-free dimensioning of the glass ribbon between the draw-in rollers 4.

The calibrated glass ribbon advances over a supporting means including a bridge 6, a supporting roller 7 on the supporting plates and conveyor rolls or rollers 9, respectively. The shaping of the glass ribbon to U-shape will be enforced by the shaping rolls 10, which are acting upon, from above.

In order to hold the stay of the profile straight, there are provided upper press rolls or press rollers 11, respectively.

The shaping of the rolled glass ribbon will be performed alternatively according to the pair of rollers 12, represented in the FIGS. 4 and 6. The finished glass ribbon, now a U-profile 13, comes thereupon on the cooling plane 14, by which the production will be conveyed to the cutting and sorting table.

Figure 8:
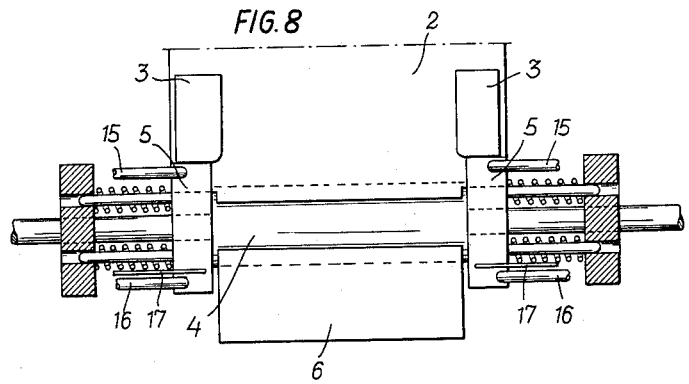
FIG. 8 shows a top view on the lower draw-in roller with the upper draw-in roller lifted off and on the establishment of the closing blocks.
Figure 9:
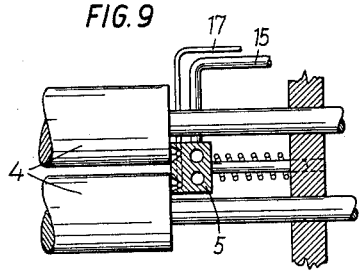
FIG. 9 shows a cut through FIG. 8 and the arrangement of a lateral closing block.
Figure 10:
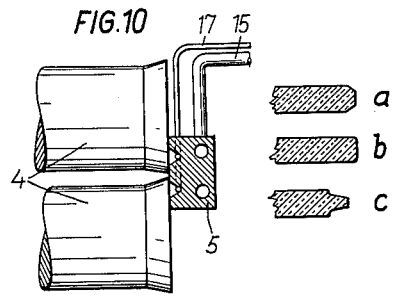
FIG. 10 shows an embodiment for the shaping of the borders. Positions *a*, *b* and *c*, show by way of example, embodiments of border formations, obtainable among others, in this manner.

As it is to be seen from the drawing (FIGS. 7 and 9), it is provided for the delivery 15 and the leading off 16 of the cooling agents to the shaping means. The lubrication takes place by means 17, as represented in the FIGS. 8 to 10.

The quoted instances of embodiment suffer indeed yet to be multiplied and also yet other shaping means to be employed.

I claim:

1. An apparatus for the manufacture of U-shaped vitreous products which consist of a median section and of two flanges laterally adjacent to and making substantially right angles with the median section, comprising means for continuously advancing a band of molten vitreous material in a predetermined direction; supporting means having a center portion in a plane for supporting the median section of said band from one side of the latter and a plurality of side portions on opposite sides of said center portion for supporting the edge portions of said band, said side portions on each side being inclined to said plane and the inclination of said side portions successively increasing in said direction; and a plurality of independent straight cylindrical shaping rollers arranged along opposite sides of said center portion, said shaping rollers having respective axes extending respectively in planes normal to said direction and parallel to the respective inclined side portions, said shaping rollers engaging said edge portions at the other side of said band and cooperating with said side portions of the supporting means for gradually deflecting said edge portions during advancing of said band to an increasingly greater extent until the edge portions form the flanges of said U-shaped vitreous product.

2. An apparatus for the manufacture of U-shape vitreous products which consist of a median section and of two flanges laterally adjacent to and making substantially right angles with the median section, comprising means for continuously advancing a band of molten vitreous material in a predetermined direction; stationary supporting means having a center portion in a plane for supporting the median section of said band from one side of the latter and a plurality of side portions on opposite sides of said center portion and integral therewith for supporting the edge portions of said band, said side portions on each side being inclined to said plane and the inclination of said side portions successively increasing in said direction; and a plurality of independent straight cylindrical shaping rollers arranged along opposite sides of said center portion, said shaping rollers having respective axes extending respectively in planes normal to said direction and parallel to the respective inclined side portions, said shaping rollers engaging said edge portions at the other side of said band and cooperating with said side portions of the supporting means for gradually deflecting said edge portions during advancing of said band to an increasingly greater extent until the edge portions form the flanges of said U-shaped vitreous product.

3. An apparatus for the manufacture of U-shaped vitreous products which consist of a median section and of two flanges laterally adjacent to and making substantially right angles with the median section, comprising means for continuously advancing a band of molten vitreous material in a predetermined direction; supporting means including a plurality of straight cylindrical center supporting rollers having respective axes in a plane for supporting the median section of said band from one side of the latter and a plurality of side rollers on opposite sides of said center rollers for supporting the edge portions of said band, said side rollers on each side having respective axes inclined to said plane and the inclination of said axes of said side rollers successively increasing in said direction; and a plurality of independent straight cylindrical shaping rollers arranged along opposite sides of said center rollers, said shaping rollers having respective axes extending respectively in planes normal to said direction and parallel to the respective inclined axes of said side rollers, said shaping rollers engaging said edge portions at the other side of said band and cooperating with said side rollers of the supporting means for gradually deflecting said edge portions during advancing of said band to an increasingly greater extent until the edge portions form the flanges of said U-shaped vitrous product.

4. An apparatus for the manufacture of U-shaped vitreous products which consist of a median section and of two flanges of constant width laterally adjacent to and making substantially right angles with the median section, comprising a source of molten vitreous material having an opening for continuously discharging a band of molten vitreous material; supporting means for one side of the band, said supporting means having a width less than the width of the band so that the edge portions of the band which are of constant width extend laterally beyond said supporting means; and shaping means including a plurality of pairs of shaping rollers arranged along and cooperating with said supporting means, the respective rollers of each pair of shaping rollers engaging the opposite edge portions of constant width at the other side of the band and the axes of successive pairs of shaping rollers being inclined to the plane of said supporting means to a progressively greater extent so as to gradually deflect said edge portions of constant width to an increasingly greater extent into planes which are substantially perpendicular to the remainder of the band whereby after final deflection the edge portions form the flanges of constant width and the remainder of the band forms the median section of the thus obtained U-shaped vitreous product.

5. An apparatus for the manufacture of U-shaped vitreous products which consist of a median section and of two flanges of constant width laterally adjacent to and extending to one side of the median section, comprising a source of molten vitreous material having an opening for continuously discharging a band of molten vitreous material; draw-in rollers located downstream of said opening and defining an equalizing gap for the band; closing means adjacent to the ends of said rollers for determining the width and the border form of the band which passes through said gap; supporting means for one side of the band, said supporting means being located downstream of said draw-in rollers and having a width less than the width of the band so that the edge portions of the band which are of constant width extend laterally beyond said supporting means; and shaping means including a plurailty of pairs of shaping rollers arranged along and cooperating with said supporting means, the respective rollers of each pair of shaping rollers engaging the opposite edge portions of constant width at the other side of the band and the axes of successive pairs of shaping rollers being inclined to the plane of said supporting means to a progressively greater extent so as to gradually deflect said edge portions of constant width to an increasingly greater extent whereby after final deflection the edge portions form the flanges of constant width and the remainder of the band forms the median section of the thus obtained U-shaped vitreous product.

6. An apparatus as set forth in claim 5, further comprising means for cooling and for lubricating said closing means, and resilient means for biasing said closing means against the end faces of said draw-in rollers to prevent escape of vitreous material in the axial direction of said draw-in rollers.

7. An apparatus for the manufacture of U-shaped vitreous products which consist of a median section and of two flanges of constant width laterally adjacent to and extending to one side of the median section, comprising a source of molten vitreous material having an opening for continuously discharging a band of molten vitreous material; supporting means for one side of the band, said supporting means having a width less than the width of the band so that the edge portions of the band which are of constant width extend laterally beyond said supporting means; and a plurality of shaping means arranged along and cooperating with said supporting means, each of said shaping means engaging the edge portions of constant width at the other side of the band and said shaping means being constructed to gradually deflect said edge portions to an increasingly greater extent whereby after final deflection the edge portions form the flanges of constant width and the remainder of the band forms the median section of the thus obtained U-shaped vitreous product, said plurality of shaping means including a plurality of pairwise arranged mirror symmetrical shaping rollers including a first pair of shaping rollers located nearest to said opening and having axes inclined only slightly with respect to the plane of the band, and at least one second pair of shaping rollers more distant from said opening and having axes whose inclination is greater than the inclination of said first mentioned axes.

8. An apparatus as set forth in claim 7, wherein the axes of said second pair of rollers are perpendicular to the plane of said band so that the flanges of the U-shaped vitreous product are perpendicular to the median section thereof.

9. An apparatus as set forth in claim 7, wherein said plurality of shaping means comprise a plurality of additional pairs of shaping rollers disposed between said first and second pairs, the inclination of such additional shaping rollers which are nearer to said second pair of shaping rollers with respect to the plane of the band being greater than the inclination of additional shaping rollers which are nearer to said first pair of shaping rollers.

10. An apparatus as set forth in claim 7, further comprising additional shaping means, one for each shaping roller and each parallel with and slightly spaced from the respective shaping roller, said additional shaping means engaging the edge portions at said one side of the band.

11. An apparatus for the manufacture of U-shaped vitreous products which consist of a median section and of two flanges of constant width laterally adjacent to and extending to one side of the median section, comprising a source of molten vitreous material having an opening for continuously discharging a band of molten vitreous material; draw-in rollers located downstream of said opening and defining an equalising gap for the band, closing means adjacent to the ends of said rollers for determining the width and the border form of the band which passes through said gap; supporting means for one side of the band, said supporting means including spaced parallel supporting rollers located downstream of said draw-in rollers and having a length less than the width of the band so that the edge portions of the band which are of constant width extend laterally beyond the ends of said supporting rollers; press rolls disposed at and engaging the other side of the band opposite said supporting rollers so that each thereof defines with the respective supporting roller a slit for the band intermediate said edge portions; and shaping means including a plurality of pairs of shaping rollers arranged along and cooperating with said supporting means, the respective rollers of each pair of shaping rollers engaging the opposite edge portions of constant width at the other side of the band and the axes of successive pairs of shaping rollers being inclined to the plane of said supporting means to a progressively greater extent so as to gradually deflect said edge portions of constant width to an increasingly greater extent whereby after final deflection the edge portions form the flanges of constant width and the remainder of the band forms the median section of the thus obtained U-shaped vitreous product.

12. An apparatus as set forth in claim 11, wherein said press rolls and said shaping means are adjustable in directions toward and away from the other side of the band.

13. An apparatus for the manufacture of U-shaped vitreous products which consist of a median section and of two flanges of constant width laterally adjacent to and extending to one side of the median section, comprising a source of molten vitreous material having an opening for continuously discharging a band of molten vitreous material; supporting means for one side of the band, said supporting means having a width less than the width of the band so that the edge portions of the band which are of constant width extend laterally beyond said supporting means; and a plurality of longitudinally spaced pairs of spring-biased shaping rollers arranged along and cooperating with said supporting means, each of said shaping rollers having an axis of rotation inclined to the plane of said supporting means and engaging the edge portions of constant width at the other side of the band, the axes of successive pairs of said shaping rollers being inclined to a progressively greater extent to said plane so as to gradually deflect said edge portions of constant width to an increasingly greater extent whereby after final deflection the edge portions form the flanges of constant width and the remainder of the band forms the median section of the thus obtained U-shaped vitreous product.

14. An apparatus for the manufacture of U-shaped vitreous products which consist of a median section and of two flanges of constant width laterally adjacent to and extending to one side of the median section, comprising a source of molten vitreous material having an opening for continuously discharging a band of molten vitreous material; a pair of draw-in rollers adjacent to said opening and defining a gap through which the band passes on its way from said opening, said rollers having profiled portions so as to impart to the corresponding portion of the band a shape of complementary profile; supporting means for one side of the band, said supporting means being located downstream of said rollers and having a width less than the width of the band so that the edge portions of the band which are of constant width extend laterally beyond said supporting means; and shaping means including a plurality of pairs of shaping rollers arranged along and cooperating with said supporting means, the respective rollers of each pair of shaping rollers engaging the opposite edge portions of constant width at the other side of the band and the axes of successive pairs of said rollers being inclined to the plane of said supporting means to a progressively greater extent so as to gradually deflect said edge portions of constant width whereby after final deflection the edge portions form the flanges of constant width and the remainder of the band forms the median section of the thus obtained U-shaped vitreous product.

15. An apparatus for the manufacture of U-shaped vitreous products which consist of a median section and of two flanges of constant width laterally adjacent to and extending to one side of the median section, comprising a source of molten vitreous material having an opening for continuously discharging a band of molten vitreous material; draw-in rollers located downstream of said opening and defining an equalizing gap for the band; closing means adjacent to the ends of said rollers for determining the width and the border form of the band which passes through said gap; means for admitting a lubricant to said closing means so that the lubricant is applied to the adjacent surface portions of the band; supporting means for one side of the band, said supporting means being located downstream of said draw-in rollers and having a width less than the width of the band so that the edge portions of the band which are of constant width extend laterally beyond said supporting means; and shaping means including a plurality of pairs of shaping rollers arranged along and cooperating with said supporting means, the respective rollers of each pair of shaping rollers engaging the opposite edge portions at the other side of the band and the axes of successive pairs of shaping rollers being inclined to a progressively greater extent to the plane of said supporting means so as to gradually deflect said edge portions of constant width whereby after final deflection the edge portions form the flanges of constant width and the remainder of the band forms the median section of the thus obtained U-shaped vitreous product.

References Cited by the Examiner
UNITED STATES PATENTS

| | | | |
|---|---|---|---|
| 2,122,083 | 6/1938 | Boudin | 65—94 |
| 2,140,213 | 12/1938 | Tegarty | 18—10 |

FOREIGN PATENTS

| | | |
|---|---|---|
| 881,334 | 6/1953 | Germany. |
| 1,063,347 | 8/1959 | Germany. |

DONALL H. SYLVESTER, *Primary Examiner.*